United States Patent [19]
Paterson

[11] 4,317,718
[45] Mar. 2, 1982

[54] GLASS SEPARATION APPARATUS

[75] Inventor: Malcolm M. Paterson, Lee, N.H.

[73] Assignee: Raytheon Company, Lexington, Mass.

[21] Appl. No.: 682,699

[22] Filed: May 3, 1976

[51] Int. Cl.³ .............................................. B03C 1/26
[52] U.S. Cl. .................................... 209/215; 209/222
[58] Field of Search .............. 209/215, 216, 222, 225, 209/228, 231; 302/26, 24

[56] References Cited
U.S. PATENT DOCUMENTS

| | | | |
|---|---|---|---|
| 2,207,434 | 7/1940 | Haven | 209/215 |
| 2,262,038 | 11/1941 | Parker | 209/215 |
| 2,964,184 | 12/1960 | Gillette | 209/215 |
| 3,029,577 | 4/1962 | Hedberg | 209/228 |
| 3,380,780 | 4/1968 | Allen et al. | 302/26 |

*Primary Examiner*—Hiram Bernstein
*Attorney, Agent, or Firm*—John T. Meaney; Joseph D. Pannone; Richard M. Sharkansky

[57] ABSTRACT

A system for separating glass particles from a mixture containing magnetic materials and glass, which system comprises a completely enclosed apparatus which protects against pollution by harmful silica dust and avoids excessive abrasion of conveying mechanism by utilization of pneumatic impulse feed devices whereby mixed particles are transported from a pressure vessel to one of a series of magnetic roller separators and further including dust separation or air cleaner means whereby substantially only glass and magnetic particles to be separated are introduced into the magnetic separators.

4 Claims, 2 Drawing Figures

GLASS SEPARATION APPARATUS

BACKGROUND OF THE INVENTION

In the recovery of natural or manufactured resources from municipal or other waste, it has been found that many recovered materials have value in either their recovered form or in subsequently modified form. Glass is one such material which may be recovered and reused.

One simple method of recovering glass is to process the resultant product produced by incineration of municipal waste, or the product produced by incineration of previously segregated glass and metal items. The products of such incineration are usually charred masses or agglomerations of partly congealed unburned metal and glass wherein metal components of the mixture are often fused directly to the glass constituents.

Aluminum constitutes a relatively large part of such waste and may be removed by flattening and filtering, for example, so that substantially only glass or silica and magnetic materials remain, the slight amount of other nonmagnetic metals being negligible.

However, it has been found that subsequent processing of the glass and magnetic materials mixture is quite difficult and objectionable. For example, during incineration the magnetic materials often become fused to the glass particles. While much of the magnetic materials can be separated from the glass during subsequent milling or other process where the materials are reduced to small particle size, many times the small glass particles still have magnetic metal fused to them, and attempts to separate such particles results in the inclusion of some metal which renders the resultant product impure. Furthermore, such processing creates a considerable amount of harmful dust which is often ejected into the surrounding atmosphere.

Known prior art systems employ particle conveying systems which move the materials at relatively high velocity. Consequently, since the glass and metal particles are highly abrasive, wear upon the conveying systems is objectionably high.

SUMMARY OF THE INVENTION

The present invention comprises a system wherein the foregoing and other disadvantages of prior art systems are partially or completely overcome by the provision of means for receiving a supply of finely fragmentized or ground particles comprising a mixture of predominantly glass and ferromagnetic materials and for transporting the mixture to selected ones of a series of magnetic separators. Such transportation is accomplished in a relatively nonabrasive manner by air pulsing which provides reduction in the conveying velocity, this being accomplished by use of a pressure bottle or vessel and an auxiliary trace air mechanism with booster stations and valves whereby substantially uniform flow and pressure drop are achieved at from 10–25% of the velocity required in conventional systems.

In the separators dust is first removed from the materials after which magnetic particles and glass particles having magnetic material fused to them are removed, leaving a residue of substantially pure glass or silica particles which are removed for subsequent reprocessing.

BRIEF DESCRIPTION OF THE DRAWINGS

The above and other advantages and objectives of the invention will become apparent from the following description taken in connection with the accompanying drawings, wherein.

DESCRIPTION OF THE PREFERRED EMBODIMENT

Figure 1:
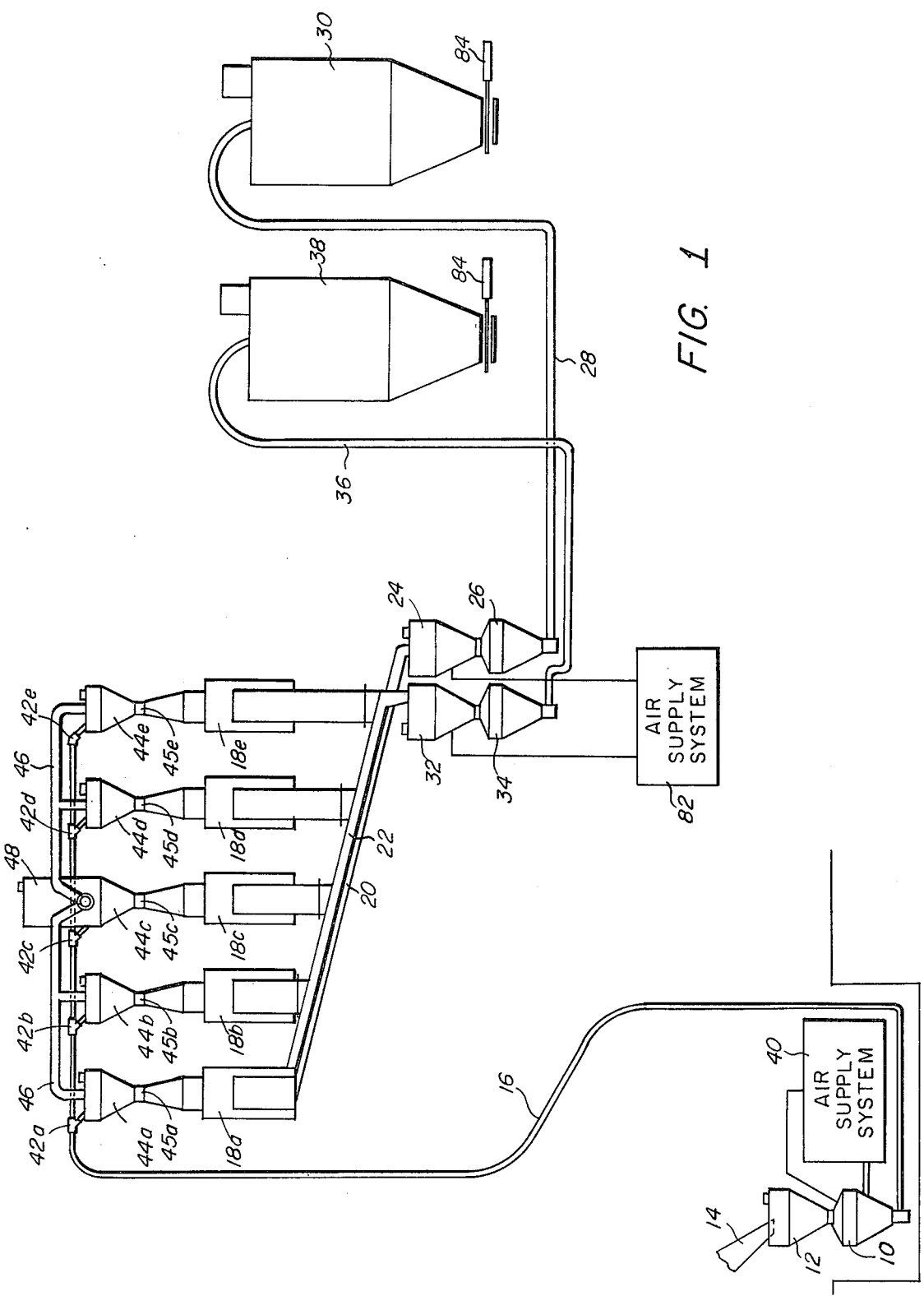
FIG. 1 is a schematic illustration of a glass-separation system embodying the invention.

The glass separation system shown in FIG. 1 is adapted to receive finely ground particles of a mixture containing glass or silica and magnetic materials with a possible addition of a negligible amount of nonmagnetic materials. This mixture often is residue from an incinerator in which municipal waste materials have been burned after removal of selected reusable materials such as aluminum, copper, gold, silver, paper, etc. Following incineration, which removes unwanted substances such as garbage, bones, and the like there remains the mixture of substantially only glass or silica and some magnetic materials which may be fused to the glass during the incineration process. This incinerated residue is ground to a fine particle size which aids in separation of the magnetic materials. However, some of the glass particles will still have magnetic materials fused to them and these particles thus must be removed along with the magnetic particles in order to obtain substantially pure glass or silica particles which may be reused by the glass industry.

The system includes a pressure vessel 10 having a hopper 12 at its upper end into which is fed the mixture to be separated. The mixture may be directed into the hopper to any suitable means such as chute 14 or other conveying device from adjacent processing equipment (not shown) such as a dryer, for example. From the pressure vessel 10 the mixture will move in a manner to be described through a conduit 16 to a selected one of a series of magnetic roller separators 18a, 18b, 18c, 18d and 18e wherein the magnetic materials will be removed and extracted through a conduit 20 and pure glass or silica is removed through a second conduit 22. The operation of the magnetic separators will be described hereinafter.

The magnetic materials are directed by conduit 20 into a hopper 24 which feeds the materials into a pressure vessel 26. Pressure vessel 26 is operated to transport the magnetic materials through a pipe 28 to a storage silo 30 where they are retained until removed for subsequent additional processing or disposal.

From conduit 22 the pure glass goes into a hopper 32 which feeds it into a pressure vessel 34. Pressure vessel 34 then operates to force the glass through pipe 36 into a storage silo 38 where it is retained until removed for subsequent processing.

Pressure vessels 10, 26 and 34 are conventional apparatus as made and sold, for example, by Acton Corporation of Cleveland, Ohio. Mixed materials to be separated are fed into pressure vessel 10 through hopper 12, and air is also introduced from system 40 in a controlled manner to achieve a pumping action whereupon the vessel discharges mixed materials into the conduit 16. Dense masses of slightly aerated materials move at low velocity through the conduit 16, each mass being followed by a high pressure air pocket or air piston. Thus, the system is a pressure system which moves the materials by action of the pressure air pistons rather than by carrying velocities. The pressure system is indicated schematically by box 40 in FIG. 1 but a more complete understanding of the system can be obtained from Acton Corporation's brochure entitled "Acton Mass Flow Pneumatic Conveyor."

When the masses of mixed materials reach the vicinity of the first magnetic separator 18a they are deflected by deflector valve 42a from conduit 16 into a hopper 44a at the top of the separator. These materials then are fed by a rotary valve 45a into the separator 18a. When hopper 44a becomes filled to a predetermined level, a level indicator switch (not shown) will operate to reverse the deflector valve 42a, causing the mixed materials to continue on in conduit 16 to the vicinity of the next separator 18b. At this point a second deflector valve 42b will operate to direct materials into a hopper 44b on separator 18b through rotary valve 45b. Again, when hopper 44b is filled to the predetermined level, a level indicator switch (not shown) will operate deflector valve 42b to cause material in conduit 16 to continue on to the next separator 18c. This sequence continues through the series of separators until deflector valve 42a is again operated to allow mixed materials to again feed into separator 18a. The deflector valves 42a–42e and also the rotary valves 45a–45e are commercially available valves such as made and sold by Semco Co.

Each hopper 44a–44e is connected by a pipe system 46 to a filter or dust collector system 48 which by way of a blower or fan device causes dustlike particles in the hopper to be entrained in a stream of air which is filtered in a manner so that large particles will be returned to the hopper while pollution-causing dust will be filtered out and collected. Any suitable dust collecting system may be used for this purpose such as Semco Model 140, DCV-145 carbon steel dust collector. Thus, the materials which eventually find their way into the separators 18a–18e comprise relatively clean particles of glass or silica and ferrous particles, with some glass particles having bits of ferrous or magnetic material fused to them.

The separators 18a–18e are of any suitable type which can efficiently separate ferrous or magnetic materials from the mixture of glass and magnetic particles. Particularly satisfactory is the high intensity magnetic separator made and sold by Dings Magnetic Separator Company of Milwaukee, Wis., and described in their catalog No. B1600-A.

Figure 2:
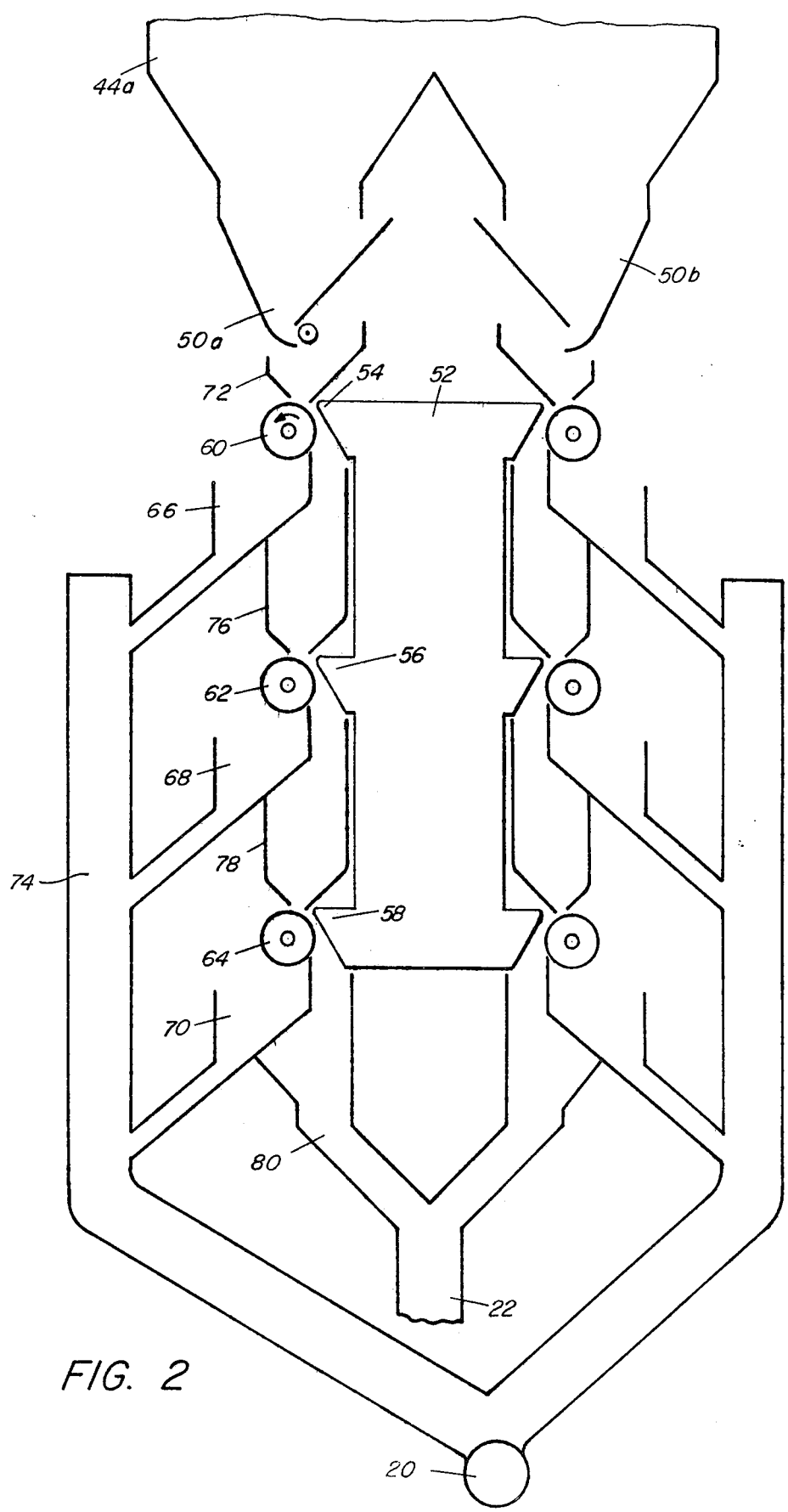
FIG. 2 is a vertical sectional view of the magnetic separator used in the system of FIG. 1.

Such a separator is shown schematically in FIG. 2 wherein a dual system is shown each including three levels of separation. The hopper 44a is provided with two discharge funnels 50a and 50b through which the materials to be separated drop to the two respective sides of the system. Beneath the hopper is magnet structure 52 having, beneath funnel 50a, three vertically spaced pole noses 54, 56 and 58. Opposite each pole nose is a respective laminated rotor or roll 60, 62 and 64. Beneath each roll is a respective chute 66, 68 and 70 which is designed to collect magnetic materials which drop from the rolls. More specifically, a magnetic field is set up in the roll 60 in the area where it is contacted by materials dropping from funnel 50a through a spout 72. Roll 60 rotates in the direction shown by the arrow and any magnetic particles will magnetically cling to the roll as it rotates. Such particles will eventually be moved out of the attracting magnetic field and will drop off the side of the roll opposite the nose 54, falling into chute 66 and thence into conduit 74.

The nonmagnetic glass or silica particles will fall off the roll 60 into the area between the roll and the nose 54 into a chute 76 which directs them onto the next lower roll 62 where they go through a second separation cycle to clean out any magnetic particles which may have inadvertently escaped being separated by roll 60. Again, any such magnetic particles will be directed into a chute 68 and thence into the conduit 74 while nonmagnetic particles will fall off roll 62 through the space between the roll and nose 56 into a chute 78. From chute 78 the particles will drop onto the third roll 64 and any succeeding magnetic rolls for additional separation of magnetic particles. This provides higher capacity, higher recovery and cleaner separation, assuring that the particles eventually collected by chute 80 are substantially pure glass or silica, while particles collected in chute 74 are magnetic or glass particles carrying bits of fused magnetic material on them.

From FIG. 2 it will be seen that the separation system on the opposite side of the magnet 52 is a substantial duplication of the described system, and all magnetic particles from both systems eventually are directed into the pipe 20, while all glass or silica particles from both sides of the apparatus enter the pipe 22.

As seen in FIG. 1, each separator 18a–18e discharges into the pipes 20 and 22, with pipe 20 directing pure glass or silica particles into the hopper 24 on pressure vessel 26, while pipe 22 directs magnetic or ferrous particles into the hopper 32 on pressure vessel 34.

Pressure vessels 26 and 34 are operated by air pistons from an air supply system 82 to force the segregated materials through the conduits 28 and 36 into the respective storage silos 30 and 38, and contents of the silos may eventually be drawn out by any suitable means such as slide valves 84, conveyors, or the like.

From the foregoing it will be apparent that all of the objectives of this invention have been achieved by the novel and improved glass separation system shown and described. It will be apparent, however, that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. A system for separating particles of glass or silica from particles of magnetic material in a commingled supply thereof, comprising the combination of a first pressure vessel for receiving said commingled materials, a magnetic separator, first conduit means connecting the separator to the pressure vessel, air control means for injecting pulses of air at spaced intervals into the pressure vessel whereby small batches of said commingled materials are intermittently directed from the vessel to the separator through the first conduit at a low velocity, means within the separator for separating the commingled materials into separate magnetic and nonmagnetic fractions, second and third pressure vessels, second conduit means for directing separated magnetic particles from the separator to said second pressure vessel, third conduit means for directing separated nonmagnetic particles from the separator to the third pressure vessel, and air control means for injecting pulses of air at spaced intervals into said second and third pressure vessels whereby small batches of the separated materials in the vessels are intermittently fed from the second and third pressure vessels to respective collection areas at a low velocity.

2. A system as set forth in claim 1 wherein a plurality of magnetic separators are disposed to sequentially receive commingled materials from said first conduit, and said second and third pressure vessels are connected to all said separators through said second and third conduit means.

3. A system as set forth in claim 2 wherein deflector valve means are disposed in said first conduit means adjacent each respective separator for controlling the sequential feeding of commingled materials to the separators.

4. A system as set forth in claim 1 wherein air supply means is connected to said second and third pressure vessels for moving separate masses of segregated magnetic and nonmagnetic particles at selected low velocity from the respective second and third pressure vessels through said second and third through said second and third to said respective collection areas.

* * * * *

UNITED STATES PATENT OFFICE
CERTIFICATE OF CORRECTION

Patent No. 4,317,718         Dated March 2, 1982

Inventor(s) Malcolm M. Paterson

It is certified that error appears in the above-identified patent and that said Letters Patent are hereby corrected as shown below:

Col. 6, line 9, delete entire line line 10, delete "third"

Signed and Sealed this

Tenth Day of August 1982

[SEAL]

Attest:

Attesting Officer

GERALD J. MOSSINGHOFF

Commissioner of Patents and Trademarks